United States Patent [19]

Richmond

[11] Patent Number: 5,218,487
[45] Date of Patent: Jun. 8, 1993

[54] AUDIO TAPE OPERATION ON A DAT DATA STORAGE DRIVE

[75] Inventor: Robert C. Richmond, Laguna Hills, Calif.

[73] Assignee: Archive Corporation, Costa Mesa, Calif.

[21] Appl. No.: 954,798

[22] Filed: Sep. 30, 1992

Related U.S. Application Data

[63] Continuation of Ser. No. 435,009, Nov. 9, 1989, abandoned.

[51] Int. Cl.$^5$ .......................... G11B 5/02; G11B 15/46
[52] U.S. Cl. .................................... 360/27; 360/73.06
[58] Field of Search ................... 360/27, 48, 72.2, 32, 360/73.06

[56] References Cited

U.S. PATENT DOCUMENTS 4,837,640 6/1989 Ozaki et al. ........................... 360/27
5,057,950 10/1991 Ozaki et al. ........................ 360/72.2

OTHER PUBLICATIONS

Translation of "Sub Code Format and Its Utilization," Adachi, Tatsuya, Matsushita Electronics Industry, Ltd., Radio Research Laboratory, JAS Journal, Nov. 1987, DAT Technology Information Series.
The DAT Conference Standard, Digital Audio Taperecorder System, "DAT Digital Audio Tape," The DAT Conference, c/o Electronic Industries Association of Japan, Engineering Department, Tokyo Chamber of Commerce & Industry Bldg., 2-2, 3-chome, Marunouchi, Chiyoda-ku, Tokyo 100, Japan, Jun., 1987.
"All present and correct," E. Tan and M. Dunstan, Systems International, Feb. 1988, Reed Business Publishing, Quadrant, Sutton, Surrey SM2 5AS.
"DAT data format takes shape," P. Bramhall and M. Dunstan, Systems International, Mar., 1988, Reed Business Publishing, Quadrant, Sutton, Surrey SM2 5AS.
"DAT for data," J. Young, E. Tan, Systems International, Reed Business Publishing, Quadrant, Sutton, Surrey SM2 5AS.
"Designing a Data Storage Format for Digital Audio Tape (DAT) Preliminary Draft-Revision 0.1," K. Odaka, E. T. Tan, B. Vermeulen, Preliminary Draft, Revision 0.1, Aug. 25, 1988.
"Isn't DAT Special?" B. Vermeulen and M. Law, Mini-Micro Systems, Dec. 1988, pp. 84-89.

(List continued on next page.)

*Primary Examiner*—Aristotelis Psitos
*Assistant Examiner*—Won Tae C. Kim
*Attorney, Agent, or Firm*—Roberts and Quiogue

[57] ABSTRACT

A computer storage DAT drive which detects the form of a DAT tape and provides an audio signal output in response to an audio DAT tape. The drive rewinds the tape and then plays the tape at a speed that is about 5 to 15 times normal playback speed. During such playback, the tape length is determined and the subcode information is read to determine the format of the tape being played back. If the subcode tape format information reliably indicates the presence of an audio tape, the speed of playback is reduced to normal playback, and audio data interface circuitry is enabled for processing the audio data and providing an audio output signal to a front panel audio jack, for example. If the tape is not recognized as an audio tape within the playback of a predetermined length of tape, playback speed is reduced to normal playback speed and reading of the subcode information continues. If the subcode tape format information indicates that the tape is a computer data storage tape, the tape is read in accordance with the appropriate data storage format. Otherwise, the tape is determined to be blank or erased tape, and playback is stopped.

A front panel eject pushbutton is utilized to provide basic controls for controlling the play of an audio tape, and front panel LEDs provide drive and cartridge status indications, including the presence of an audio format tape.

8 Claims, 4 Drawing Sheets

OTHER PUBLICATIONS

"Digital audio tape for data storage," E. Tan and B. Vermeulen, IEEE Spectrum, Oct. 1989, pp. 34–38.

3rd Draft-Proposed American National Standard Helical-Scan Digital Computer Tape Cartridge 3.81 mm (0.150 in) for Information Interchange, Jan. 31, 1989.

5rd Draft-Proposed American National Standard Helical-Scan Digital Computer Tape Cartridge 3.81 mm (0.150 in) for Information Interchange, Oct. 31, 1990.

7rd Draft-Proposed American National Standard Helical-Scan Digital Computer Tape Cartridge 3.81 mm (0.150 in) Digital Data Storage (DDS) Recorded Format for Information Interchange, Apr., 1991.

AUDIO TAPE OPERATION ON A DAT DATA STORAGE DRIVE

This is a continuation of copending application Ser. No. 07/435,009 filed on Nov. 9, 1989 abandoned.

BACKGROUND OF THE INVENTION

The disclosed invention is directed generally to computer storage digital audio tape (DAT) drives, and more particularly is directed to a computer data storage DAT drive that automatically recognizes the presence of audio data on a DAT tape and provides for proper playback of the audio tape.

Digital audio tape (DAT) technology, which was developed for audio programming, has been adapted for storage of computer data. An example of a format for the storage of computer data utilizing DAT technology is the American National Standards Institute (ANSI) Digital Data Storage (DDS) standard, presently in draft form ("PROPOSED AMERICAN NATIONAL STANDARD HELICAL-SCAN DIGITAL COMPUTER TAPE CARTRIDGE 381 mm (0.150 in) FOR INFORMATION INTERCHANGE," ASC X3 Project No. 668-D).

The characteristics that have made DAT technology attractive for computer data storage include high capacity, high transfer rate capability, relatively small media size and low media cost, and the adaptability of DAT technology to conform with personal computer storage device form factors including the 5¼ and 3½ inch forms.

The use of DAT technology for storage of computer data can be achieved by application of a data storage format, such as the above-referenced ANSI DDS format, to the DAT format. In particular, the DAT physical track format is retained, but the contents of the information stored in the tracks is in accordance with the computer data storage format.

As a result of the use of the DAT physical tape format, a computer storage DAT drive can provide some of the functions for reading DAT audio tapes. Thus, for example, a computer storage DAT drive would be able to extract the PCM data and the subcode information from a DAT audio tape, but typically would not recognize the tape. Nor would it have the capability of providing an audio output signal, either in digital or analog form.

A further consideration with format detection with a computer storage DAT drive is the procedure by which the tape format is detected. For example, pursuant to the DDS format, a tape is positioned near the beginning of the tape to permit unambiguous format detection, for example, for a re-recorded data tape that had been previously recorded with audio. On a DDS tape, the area containing format information is at some distance from the beginning of the tape media, and searching for the format detection area on a DAT data tape at normal playback speed takes a relatively long time. However, the format detection area on a DAT data tape is relatively small and thus cannot be read at high speeds such as ×200 (200 times normal playback speed designated as ×1).

SUMMARY OF THE INVENTION

It would therefore be an advantage to provide a computer storage DAT drive that distinguishes between DAT audio tapes and DAT computer data storage tapes, and which provides an audio output signal pursuant to an audio tape.

Another advantage would be to provide a computer storage DAT drive that efficiently and quickly determines the tape format with minimum tape and mechanism wear.

The foregoing and other advantages are provided in a DAT read technique that includes the steps of rewinding the tape and playing the tape at a speed that is about 5 to 15 times the normal playback speed. During such playback, the tape length is determined and the subcode information is read to determine the format of the tape being played back. If the subcode tape format information reliably indicates an audio tape, the speed of playback is reduced to normal playback, and audio data interface circuitry is enabled for processing the audio data and providing an audio output signal to a front panel audio jack, for example. If the tape is not recognized as an audio tape within the playback of a predetermined length of tape, playback speed is reduced to normal playback speed and reading of the subcode information continues. If the subcode tape format information indicates that the tape is a computer data storage tape, the tape is read in accordance with the appropriate data storage format. Otherwise, the tape is determined to be blank or erased tape, and playback is stopped.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION OF THE DISCLOSURE

In the following detailed description and in the several figures of the drawing, like elements are identified with like reference numerals.

By way of illustrative example, the disclosed invention can be implemented generally in accordance with the ANSI DDS standard, and by way of illustration the following disclosure is based upon compliance with certain aspects of the DDS standard at least as to the tape layout for the beginning of the tape. However, it should be readily appreciated by persons skilled in the art from a reading of the subject disclosure that other data storage formats can be utilized to implement the invention.

Figure 1A:
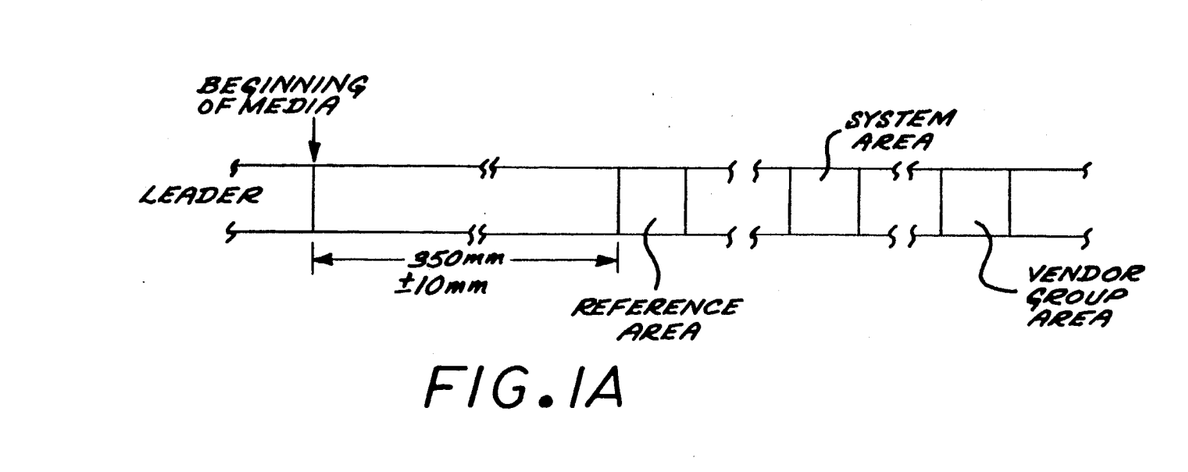
FIG. 1A schematically illustrates the initial portion of a physical DAT tape format utilized for computer data storage.
Figure 1B:
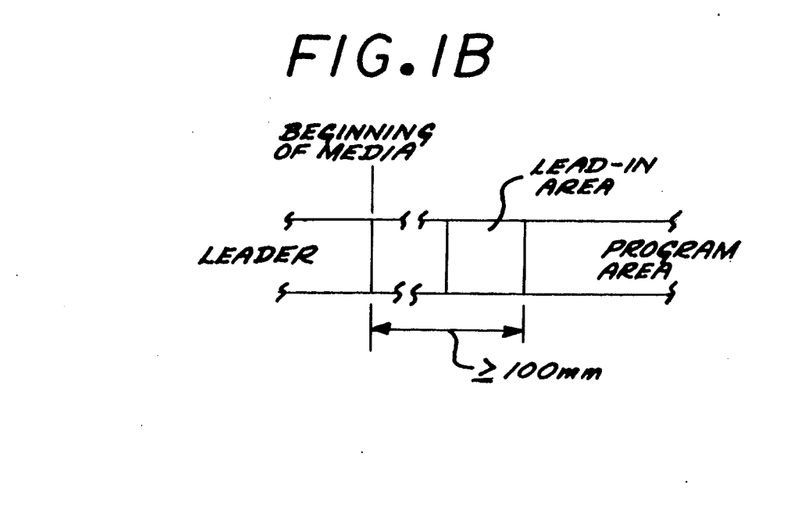
FIG. 1B schematically illustrates the initial portion of a physical DAT tape format utilized for audio data storage.

FIGS. 1A and 1B schematically depict the initial portions of the respective physical tape formats for a DAT DDS data tape and a DAT audio tape, which are helpful in understanding the subject invention.

Referring in particular to FIG. 1A, in a DAT DDS data tape, a Reference Area begins at 350 mm, ±10 mm, from the beginning of the tape media (BOM) which is where the magnetic tape is joined to the tape leader.

The location at the beginning of the Reference area is also called the logical Beginning of Tape (BOT). The Reference Area is followed by a System Area, which in turn is followed by a Vendor Group Area. Areas between the Reference Area, System Area, and Vendor Group Area can contain subcode information pursuant to the DDS format.

The subcode information in the Reference Area and the System Area include tape format identification information, for example, in the Data ID code of subcode blocks in accordance with the ANSI DDS standard. However, the Reference and System Areas are relatively short and, thus, cannot be read at high speeds such as $\times 200$, which is 200 times normal playback speed designated as $\times 1$. In accordance with the ANSI DDS standard, the System Area includes subcode data which is read for appropriate initialization. The Vendor Group Area includes frame data which must be read at the normal playback speed $\times 1$.

Referring now to FIG. 1B, the initial portion of a DAT audio tape is not as explicitly defined as a DAT DDS data tape. In a DAT audio tape, the first program area begins at a location greater than or equal to 100 mm from the BOM. Prior to the Program Area is a Lead-In Area which includes subcode information containing tape format identification information, for example, in the Data ID code of subcode blocks in accordance with the DAT format. The Lead-In Area can be read at higher than normal playback speed, but the playback speed must be reduced for reading of the Program Area. Typically, the Program Area includes an initial Pause Area which is followed by the program information.

In a DAT audio tape the distance from the BOM to the first Program Area will not be much greater than 100 mm, and the format identification information for a DAT audio tape generally will be detected closer to the BOM than on a DAT DDS data tape.

Figure 2:
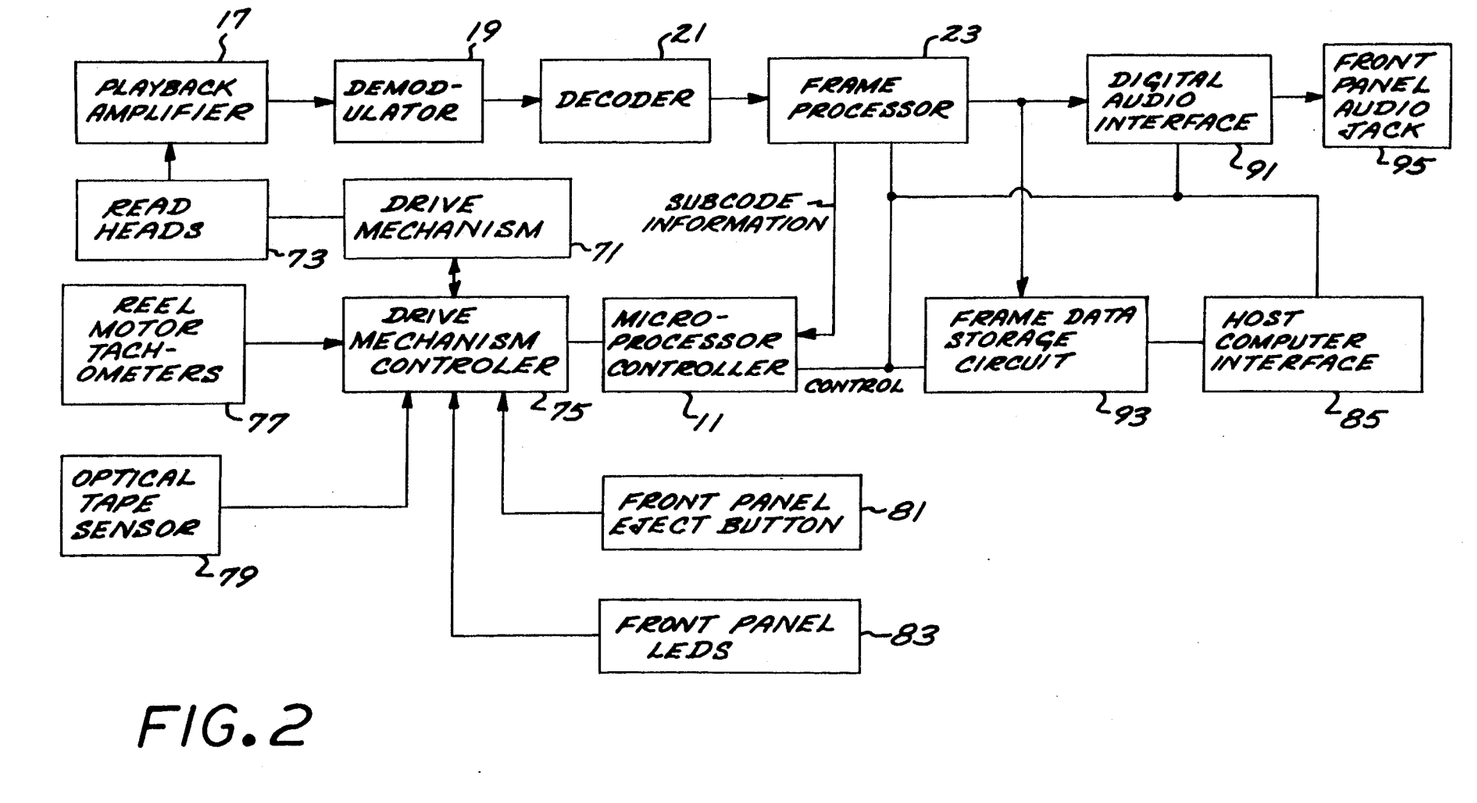
FIG. 2 is a block diagram of a data storage DAT drive in accordance with the invention.

Referring now to FIG. 2, shown therein is a generalized block diagram of components of a computer storage DAT drive in accordance with the invention for detecting and distinguishing DAT data tapes and DAT audio tapes.

A microprocessor controller 11 provides overall control, and comprises, for example, a microprocessor, memory elements, and input/output circuitry. A tape drive mechanism 71 drives rotating tape read heads 73 and is controlled by a drive mechanism controller 75 which in turn is controlled by the microprocessor controller 11. By way of example, the drive mechanism controller 75 can be microprocessor based controller. The tape drive mechanism would include standard mechanical components such as a head cylinder, a capstan, tape reel guides, tape reel motors, and so forth.

Respective reel motor tachometers 77 are responsive to the rotation of the reel motors in the drive mechanism 71 and provide to the drive mechanism controller 75 tachometer signals (e.g., a predetermined number of pulses per revolution) indicative of the speeds of rotation of the tape reel motors. The tachometer signals are utilized by the drive mechanism controller 75 to control the reel motor speeds, and, as discussed further herein, are also utilized to determine total tape length and to determine amount of tape played.

An optical tape sensor 79 coupled to the drive mechanism controller 75 is utilized to sense the BOM which is the junction between the transparent tape leader and the magnetic tape, for example, during rewind or when tape is being played. The drive mechanism controller 75 further receives an input signal from a front panel eject push button 81, and provides outputs to front panel LED's 83, as described further herein.

The microprocessor controller 11 is connected to a host computer via an interface 85, for example, a SCSI interface, or it can comprise microprocessor circuitry of the host computer.

A tape playback amplifier 17 responsive to the read heads 73 provides its RF playback signal to a demodulator 19 which provides an output comprising a serial bit stream that includes frame data and subcode information. The output of the demodulator 19 is processed by a decoder 21 which provides, for example, a first level of error correction code (ECC) processing on the demodulated signal as well as decomposition of the demodulated data into frame data and subcode information. The subcode information decoded by the decoder 21 is selectively accessed by the microprocessor 11, for example, from a memory in the decoder 21.

The frame data output of the decoder 21 is provided to a frame processor 23 which applies a second level of ECC processing and de-interleaves the frame data from the two tracks comprising a frame to provide a serial frame data output. The serial frame data, which can comprise audio data, is provided to a digital audio interface 91 as well as to a frame storage circuit 93. The digital output of the audio interface 91 is connected to a front panel audio jack which, for example, can be a standard miniature or sub-miniature phone jack. Alternatively, the audio interface 91 would include appropriate digital-to-analog conversion circuitry so as to provide analog audio signals to the front panel audio jack 95.

In accordance with the invention, DAT tape format detection is generally achieved as follows. The tape is rewound completely, which, depending on the drive mechanism and the tape cartridge, can position the tape so that the tape heads are at a location that is ahead of the BOM. Such positioning of the tape with the tape heads near the BOM insures that the tape can be properly identified and that information recorded thereon can be properly read.

The tape is then played back at a medium playback speed, for example, in the range of about $\times 5$ to $\times 15$ (i.e., about 5 to 15 times normal playback speed). This speed is chosen so that the format identification areas on a DAT data tape can be reached quickly while maintaining the capability of reading the subcode information in the relatively short Reference and System Areas and decelerating to achieve ATF at normal playback speed prior to reading the Vendor Group area. Such medium playback speed also permits fast detection of an audio tape while maintaining the capability of decelerating to normal playback speed for the Program Area. Further, the medium playback speed permits the format detection sequence including speed change to be achieved without a mode change since the tape capstan drive is utilized for medium speed playback.

Figure 3:
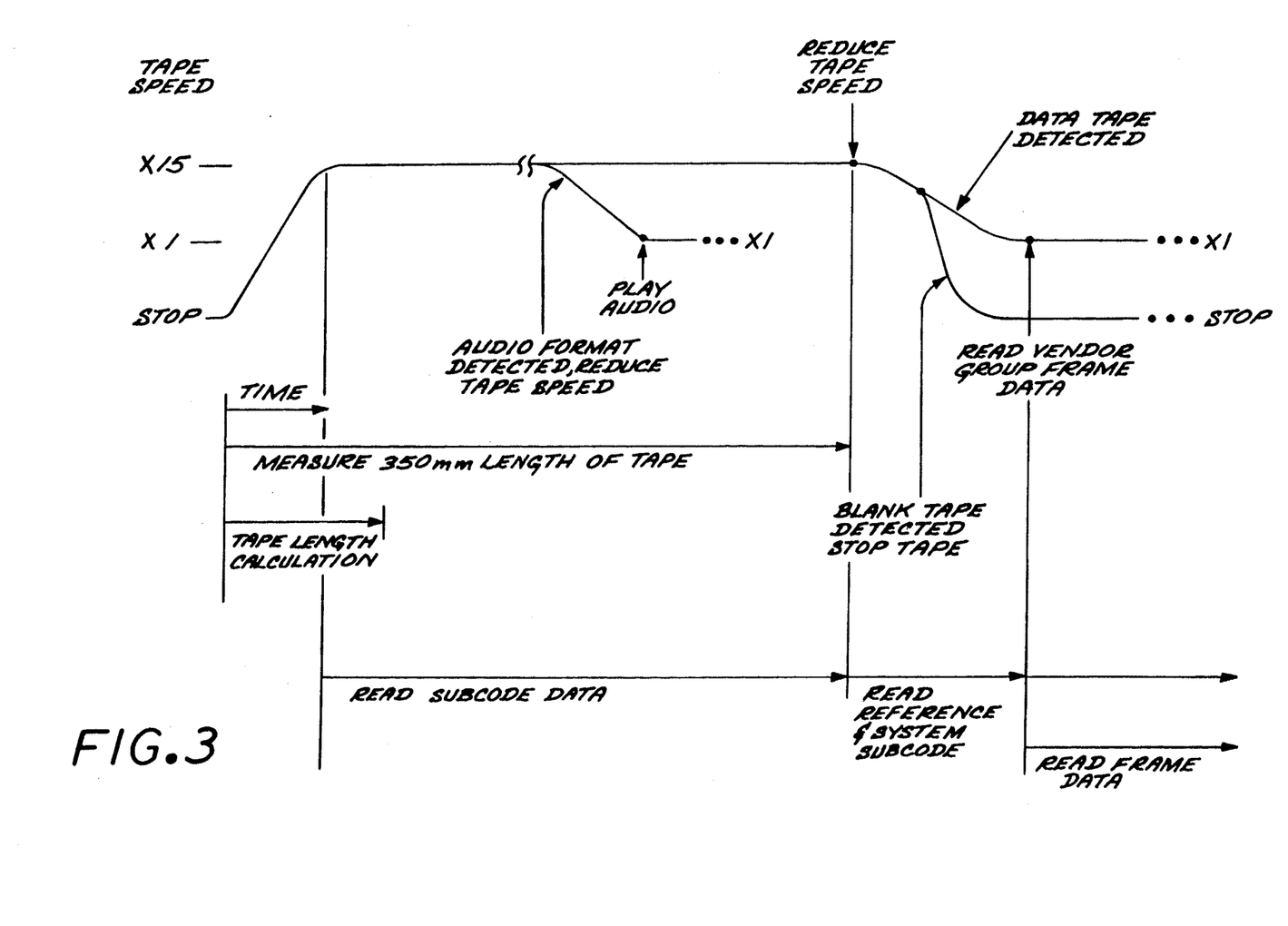
FIG. 3 is a timing diagram showing speed and tape format detection functions relative to elapsed time.

Referring to the timing diagram of FIG. 3, several procedures take place during the medium speed playback, sometimes concurrently:

(A) The data from the initial portion of the tape immediately following the BOM (e.g., about 50 mm) is not read since such area may include data that was not completely erased if the tape was re-recorded with a format different from the format of the prior recording. Also, a part of such initial portion might not be accessible due to the length of the tape leader and the geometry of the tape path.

(B) The total tape length is being determined, for example, by calculation based on the ratio of pulse counts generated by the reel motor tachometers. Tape length information can be utilized to optimize the reel drive motor currents to provide precise tape tension, and can also be utilized by the host computer to determine tape storage capacity.

(C) After the initial portion of the tape media is ignored for data, the subcode tape format information is read.

(D) If an audio is detected, playback speed is reduced to normal playback speed, the digital audio interface 91 is enabled, and the frame data storage circuit 93 is disabled.

(E) If a predetermined amount of tape as specified by the DDS format has been played and an audio tape has not been detected, the tape speed is reduced while reading of the subcode tape format information continues. Such predetermined amount of tape is measured from the BOM, and is achieved, for example, by determining the length of tape played pursuant to calculations based on the reel motor tachometer signals and adjusting for the known geometrical relation between the positions of the optical sensor and the tape head cylinder, and the tape path. Stated another way, if a predetermined location on the tape as specified by the DDS format is reached without detection of an audio format, the tape speed is reduced while subcode information continues to be read.

(F) If a computer data storage tape is not detected, the tape is stopped, and the tape is regarded as a blank tape.

(G) If the subcode format information from the Reference and System Areas identify the tape as a data tape, the frame data storage circuit 93 is enabled, the digital audio interface 91 is disabled, and the tape is read in accordance with the appropriate data format such as DDS. In particular, without additional start/stop tape movement or delay, the subcode information in the System Area is read as part of the DDS initialization procedure, and the Vendor Group Area frame data is read.

Figure 4:
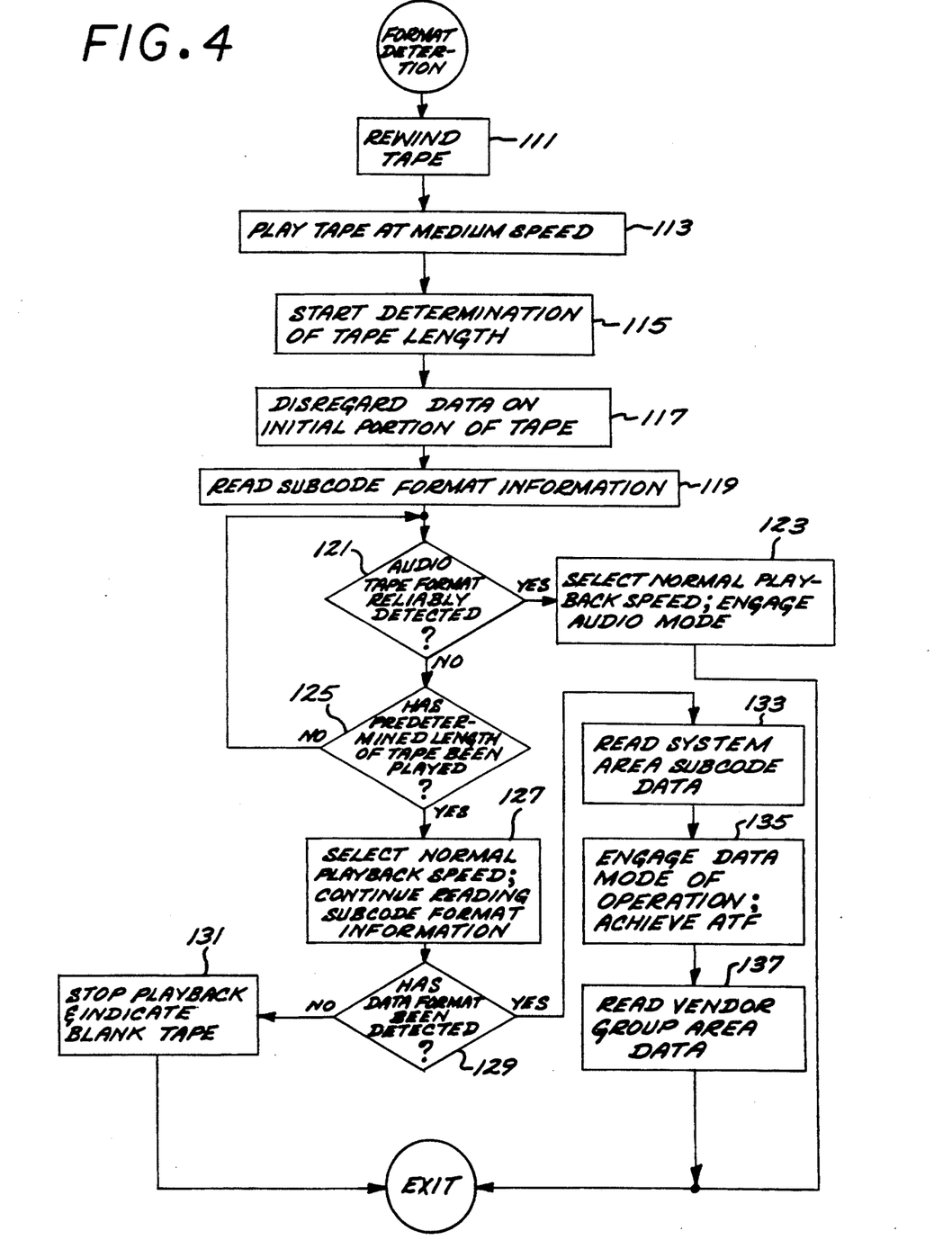
FIG. 4 is a flow diagram of an illustrative tape format detection process in accordance with the invention.

Referring now to FIG. 4, set forth therein is a flow diagram of a process in accordance with the invention for reading and detecting the format of a DAT tape. At 111 the tape is rewound at high speed. Pursuant to 113, the tape is played at medium speed, for example, in the range of ×5 to ×15. At 115 the process for calculating tape length is started, and at 117 the information from the initial portion of the tape, for example, a length of about 50 mm, is disregarded. After the information from such initial portion of tape is disregarded, the subcode tape format information is read continuously pursuant to 119. At 121 a determination is made as to whether the subcode tape format information reliably indicates that the tape is an audio tape. For example, if the subcode tape format information in a predetermined number of frames, for example, six, indicate an audio format, then an audio tape has been reliably indicated. If the determination at 121 is yes, an audio tape has been reliably detected, at 123 the tape speed is changed to normal playback speed and the audio mode of operation is selected. The format detection process is then exited.

If the determination at 121 is no, an audio tape has not been detected, a determination is made at 125 as to whether the predetermined length of tape called for by the data format has been played. If no, processing continues at 121, described above.

If the determination at 125 is yes, the predetermined tape length has been played, at 127 the tape speed is changed to normal playback speed, and reading of the subcode tape format information continues while the tape is decelerating. At 129 a determination is made as to whether the subcode tape format information indicates a data storage tape format. If no, at 131 the tape is stopped and the presence of a blank tape is indicated. The format detection process is then exited.

If the determination at 129 is yes, the subcode tape format information indicates a data storage format, then at 133 the System Area subcode data is read. At 135 the data mode of operation is selected and ATF (automatic track finding) synchronization is achieved. At 137 the Vendor Group Area frame data is read, and then the format detection process is exited.

In conjunction with the format detection process, the front panel EJECT 81 pushbutton can be utilized to provide control functions as a function of detected format, and the LEDs 83 can provide visual indications of the tape format detected.

For example, in the data mode of operation, pursuant to depression of the EJECT pushbutton, the tape is rewound to the System Area, the system log in the System Area is updated, and the tape is then fully rewound. If data was being recorded to tape, any data in the record buffer is written to tape together with an End of Data marker prior to rewind and log update.

In the audio mode of operation the eject pushbutton can be used to provide some basic controls similar to those available on CD (Compact Disc) players. For example, momentary depression of the Eject button can be defined to cause the current program to be skipped. Momentary depression of the pushbutton during a forward skip can be defined to cause play of the program prior to the one being skipped. Holding down the pushbutton for a predetermined amount of time such as 4 seconds can be defined to cause the audio cartridge to be ejected.

By way of example, the front panel LEDs 83 comprise a cartridge status LED and a drive status LED for providing independent status indications during data mode operation. In particular, the cartridge status LED is on when a cartridge is in the drive mechanism, and the drive status LED is on when the tape is moving.

In the audio mode of operation the LEDs 83 can be controlled to unambiguously indicate an audio tape by providing indications not utilized in the data mode of operation. For example, the LED indicators can be controlled to flash simultaneously at a slow rate to indicate the presence of an audio tape. Alternatively, the cartridge status LED can be controlled to flash at a slow rate to indicate the presence of an audio tape.

In addition to the foregoing, more elaborate control can be provided via the host computer interface 85.

The foregoing has been a disclosure of a computer storage DAT drive that efficiently determines the type of tape being played back, and which provides an audio output signal pursuant to an audio tape. The format detection provided by the drive advantageously minimizes initialization time, and reduces tape and mechanical wear by calculating tape length while the tape is being played back at a medium speed that permits relatively fast detection of a data format tape, instead of utilizing a separate operation for tape length determination. Further, the disclosed computer storage DAT drive transitions from tape format detection to data mode operation without the delay and wear of additional start/stop tape movement. The disclosed computer storage DAT drive also provides the advantages of a front panel audio jack output and front panel audio control via a front panel drive eject pushbutton.

Although the foregoing has been a description and illustration of specific embodiments of the invention, various modifications and changes thereto can be made by persons skilled in the art without departing from the scope and spirit of the invention as defined by the following claims.

What is claimed is:

1. In a computer data storage DAT drive having a capstan drive, a method for detecting the format of a DAT tape, comprising the steps of:

positioning the tape for reading at a reference location near the beginning of the tape media to insure that any tape format identification data on the tape will be encountered in playback;

playing the tape with the tape capstan drive at a speed that is greater than normal playback speed;

calculating tape length while the tape is being played with the tape capstan drive at a speed that is greater than normal playback speed;

reading the subcode tape format identification information from the tape while the tape is being played with the tape capstan drive at a speed that is greater than normal playback speed;

if the subcode tape format identification information reliably indicates an audio format before a predetermined length of tape has been played from the beginning of the tape media, where the predetermined length corresponds to the distance from the beginning of the tape media to the beginning of the Reference area of a DAT tape having a data format, reducing tape speed to normal playback speed without stop and start of the tape, and engaging an audio mode of operation; and if the predetermined length of tape from the beginning of the tape media is played without the subcode tape format identification information having reliably indicated an audio format, reducing tape speed to normal playback speed without stop and start of the tape, and engaging a data mode of operation if the subcode tape format identification information indicates a data format.

2. The method of claim 1 wherein the step of playing the tape includes the step of playing the tape at a speed that is about 5 to 15 times faster than normal playback speed.

3. The method of claim 1 wherein the step of the reading the subcode tape format identification information includes the step of determining whether the subcode tape format identification information from a predetermined number of frames consistently indicate an audio format, which provides a reliable indication that the tape is an audio tape.

4. The method of claim 1 wherein the step of reading the subcode tape format identification information includes the step of disregarding the initial portion of the tape ahead of the beginning of the tape media.

5. The method of claim 1 further including the step of stopping the tape is neither audio nor data format is detected.

6. The method of claim 1 further including the step of providing an audio signal output to an audio jack if an audio format is detected.

7. In a computer data storage DAT drive having a capstan drive, a method for detecting the format of a DAT tape, comprising the steps of:

positioning the tape for reading near the beginning of the tape media;

playing the tape with the tape capstan drive at a speed that is about 5 to 15 times faster than normal playback speed;

calculating tape length while the tape is being played with the tape capstan drive at a speed that is greater than normal playback speed;

disregarding the information on the initial portion of the tape ahead of the beginning of the tape media while the tape is being played with the tape capstan drive at a speed that is greater than normal playback speed;

reading the subcode tape format identification information from the tape after the initial tape portion is disregarded and while the tape is being played with the tape capstan drive at a speed that is greater than normal playback speed;

if the subcode tape format identification information reliably indicates an audio format before a predetermined length of tape has been played from the beginning of the tape media, where the predetermined length corresponds to the distance between the beginning of the tape media to the beginning of the Reference area of a DAT tape having a data format, reducing tape speed to normal playback speed without stop and start of the tape, and engaging an audio mode of operation;

if the predetermined length of tape from the beginning of the tape media is played without the subcode tape format identification information having reliably indicated an audio format, reducing tape speed to normal playback speed without stop and start of the tape, and engaging a data mode of operation if the subcode tape format identification information indicates a data format; and stopping the tape if neither audio nor data format is detected.

8. The method of claim 7 further including the step of providing an audio signal output to an audio jack if an audio format is detected.

* * * * *

UNITED STATES PATENT AND TRADEMARK OFFICE
CERTIFICATE OF CORRECTION

PATENT NO. : 5,218,487

DATED : June 8, 1993

INVENTOR(S) : Robert C. Richmond

It is certified that error appears in the above-identified patent and that said Letters Patent is hereby corrected as shown below:

Claim 5 at column 8, line 7, please delete "is" and insert therefor -- if --

Claim 7 at column 8, line 19, please delete "faster" and insert therefor -- greater --

Signed and Sealed this

Twenty-ninth Day of March, 1994

*Attest:*

*Attesting Officer*

BRUCE LEHMAN

*Commissioner of Patents and Trademarks*